US009505982B2

(12) United States Patent
Lah

(10) Patent No.: US 9,505,982 B2
(45) Date of Patent: Nov. 29, 2016

(54) SEAT SYSTEM FOR COKE DRUM DEHEADING VALVE

(71) Applicant: Ruben F. Lah, South Jordan, UT (US)

(72) Inventor: Ruben F. Lah, South Jordan, UT (US)

(73) Assignee: DeltaValve, LLC, Sandy, UT (US)

(*) Notice: Subject to any disclaimer, the term of this patent is extended or adjusted under 35 U.S.C. 154(b) by 742 days.

(21) Appl. No.: 13/874,103

(22) Filed: Apr. 30, 2013

(65) Prior Publication Data
US 2013/0233694 A1 Sep. 12, 2013

Related U.S. Application Data

(63) Continuation-in-part of application No. 13/460,672, filed on Apr. 30, 2012, now Pat. No. 8,936,701, which is a continuation of application No. 11/151,055, filed on Jun. 13, 2005, now Pat. No. 8,679,299, which is a continuation of application No. 10/442,673, filed on May 20, 2003, now Pat. No. 6,964,727, which is a continuation-in-part of application No. 09/946,917, filed on Sep. 5, 2001, now Pat. No. 6,565,714.

(60) Provisional application No. 61/640,586, filed on Apr. 30, 2012, provisional application No. 60/275,527, filed on Mar. 12, 2001.

(51) Int. Cl.
C10B 25/10 (2006.01)
C10B 25/20 (2006.01)
F16K 3/12 (2006.01)
F16K 3/36 (2006.01)
F16K 3/02 (2006.01)

(52) U.S. Cl.
CPC ............. C10B 25/20 (2013.01); C10B 25/10 (2013.01); F16K 3/02 (2013.01); F16K 3/36 (2013.01)

(58) Field of Classification Search
CPC .......... F16K 3/02; F16K 3/36; C10B 25/10; C10B 25/20
USPC ........ 251/259, 170–174, 193, 326–328, 333, 251/362; 202/241, 245; 137/246, 246.11, 137/246.22
See application file for complete search history.

(56) References Cited

U.S. PATENT DOCUMENTS

| 3,620,243 | A | * | 11/1971 | Zatopek | F16K 5/205 137/246.22 |
| 3,916,940 | A | * | 11/1975 | Allen | F16K 5/227 137/246.22 |
| RE29,299 | E | * | 7/1977 | Estes | F16K 3/36 137/246.22 |
| 4,067,542 | A | * | 1/1978 | Morrison | F16K 3/207 251/174 |
| 2011/0272617 | A1 | * | 11/2011 | Lah | C10B 25/10 251/359 |

* cited by examiner

Primary Examiner — Marina Tietjen
(74) Attorney, Agent, or Firm — Michael F. Krieger; Kirton McConkie

(57) ABSTRACT

A seat system for a coke drum deheading valve can include a groove in the surface of the seat for supplying a lubricant to the surface of the seat. Various channels can be formed in the body of the seat that connect to the groove. In this way, lubricant can be flowed through the channels and into the groove to provide lubrication between the surface of the seat and the blind. The seat system can also include a split ring packing gland to facilitate the formation of a seal within the deheading valve. The split ring packing gland can be used to retain and compress packing positioned between a retaining ring and a dynamic seat such that when the packing is compressed, an improved seal is formed. By improving the seal, less steam can be required during the delayed coking process thereby increasing the efficiency of the system.

14 Claims, 13 Drawing Sheets

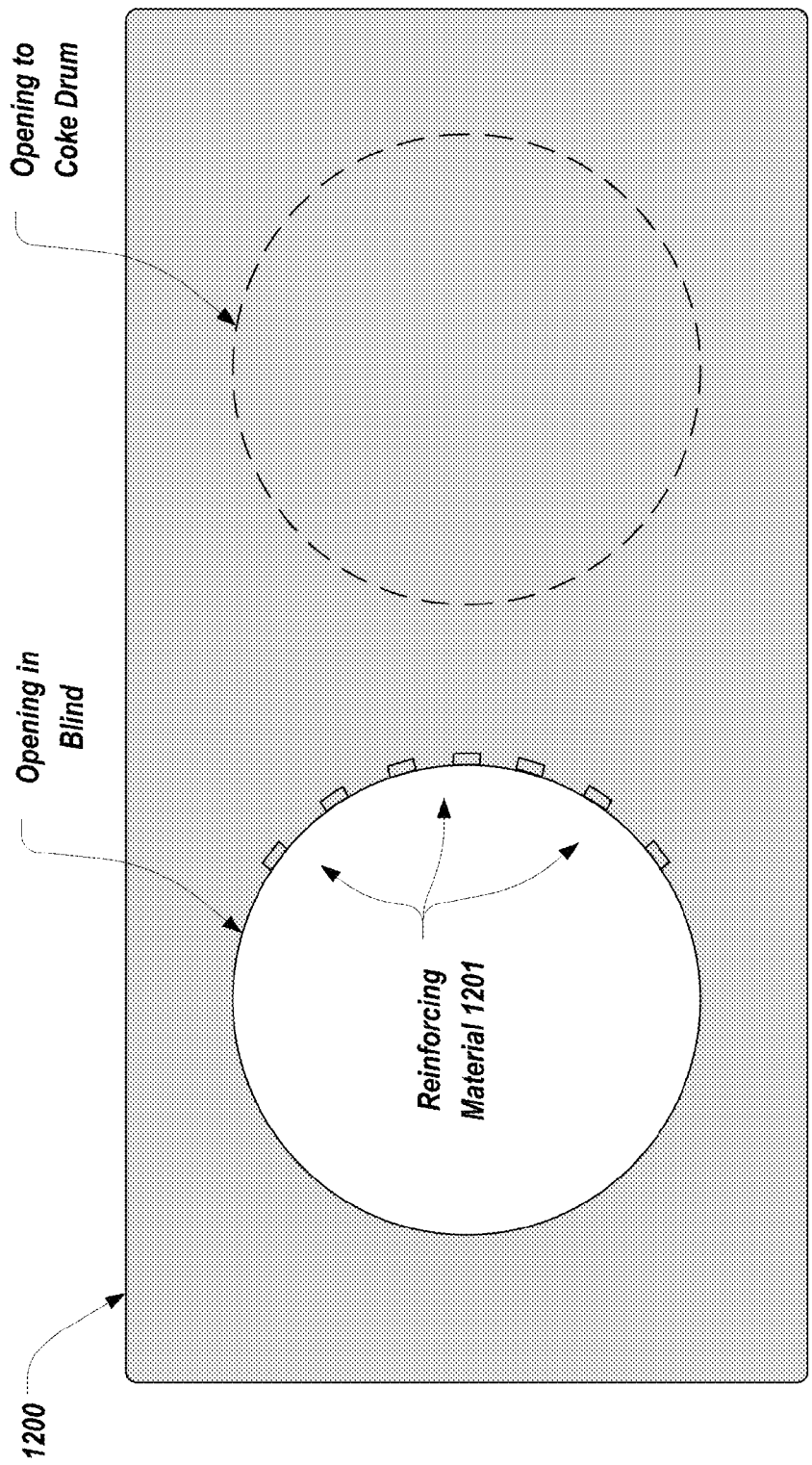

SEAT SYSTEM FOR COKE DRUM DEHEADING VALVE

CROSS-REFERENCE TO RELATED APPLICATIONS

This application is a continuation-in-part of U.S. patent application Ser. No. 13/460,672 filed on Apr. 30, 2012 which is a continuation-in-part of U.S. patent application Ser. No. 11/151,055 filed on Jun. 13, 2005 which is continuation of U.S. patent application Ser. No. 10/442,673, now U.S. Pat. No. 6,964,727, filed on May 20, 2003 which is a continuation in part of U.S. patent application Ser. No. 09/946,917, now U.S. Pat. No. 6,565,714, filed on Sep. 5, 2001 which claims priority to U.S. Provisional Patent Application Ser. No. 60/275,527 filed on Mar. 12, 2001.

This application also claims priority to U.S. Provisional Patent Application Ser. No. 61/640,586 filed on Apr. 30, 2012.

BACKGROUND

Petroleum refining operations in which crude oil is processed frequently produce residual oils that have very little value. The value of residual oils can be increased using a process known as delayed coking. Residual oil, when processed in a delayed coker, is heated in a furnace to a temperature sufficient to cause destructive distillation in which a substantial portion of the residual oil is converted, or "cracked" to usable hydrocarbon products and the remainder yields a residual petroleum by-product which is pumped into a large vessel known as a coke drum.

The production of coke is a batch process. Each delayed coker unit usually contains more than one coke drum. In delayed coking, the feed material is typical residuum from vacuum distillation towers and frequently includes other heavy oils. The feed is heated as it is sent to one of the coke drums. The feed arrives at a coke drum with a temperature ranging from 870 to 910° F. Typical drum overhead pressure ranges from 15 to 35 PSIG. Coker feedstock is deposited as a hot liquid slurry in a coke drum. Under these conditions, cracking proceeds and lighter fractions produced flow out of the top of the coke drum and are sent to a fractionation tower where they are separated into vaporous and liquid products. A solid, residuum called coke is also produced and remains within the drum. When a coke drum is filled, residual oil from the furnace is diverted to another coke drum. When a coke drum is filled to the desired capacity, and after feedstock is diverted to another drum, steam is typically introduced into the drum to strip hydrocarbon vapors off of the solid material. The material remaining in the coke drum cools and is quenched. Solid coke forms as the drum cools and must be removed from the drum so that the drum can be reused. While coke is being cooled in one drum and while the cooled solid coke is being extracted from that drum, a second drum is employed to receive the continuous production of coke feedstock as a part of the delayed coker process. The use of multiple coke drums enables the refinery to operate the furnace and fractionating tower continuously. Drum switching frequency ranges from 10 to 24 hours.

In typical coking operations dramatic heat variances are experienced by elements in the coking operation. For example, a coke drum is filled with incoming byproduct at about 900 degrees Fahrenheit and subsequently cooled after being quenched to nearly ambient temperatures. Not surprisingly, this repetitive thermal cycling may create or cause significant problems including stark heat distributing variances throughout various components of a valve system. The heated residual byproduct utilized in coking operations comes into contact with not only the coke drum, but valve and seat components. This heating and subsequent cooling may result in expansion of various elements within a valve system. As previously mentioned the delayed coking process typically comprises at least two vessels so that while one is being filled the other is being purged of material and prepared to receive another batch of byproduct. Thus, during the off cycle, when a vessel is being purged of its contents it will cool and return to a state of equilibrium. It is this cyclical pattern of dispensing hot residual byproduct into a coke drum and subsequently cooling the byproduct that leads to thermal differential and stress within the coke drum, a valve, the valve parts or a line. It is this cyclical loading and unloading and stressing and un-stressing of a coke drum, valve or line that is referred to as thermal cycling. Thermal cycling typically results in the weakening or fatiguing of a coke drum, a valve and its parts which may lead to a reduction in the useful life of the components. Uneven heat distributions or thermal variants existing between various components of the seat system result in decreased longevity of the constitutive elements of the valve body.

Also, because coke is formed using pressure, the deheading valve must form a seal to allow the pressure to build within the coke drum. This seal is generally formed using tight tolerances between the components of the deheading valve such as between the seats and the blind. These tight tolerances, however, increase the force required to slide the blind between the seats to open and close the valve. Also, due to this pressure, it is common to pressurize the internal compartments of the deheading valve such as by providing steam to the internal compartment. If a deheading valve does not provide a good seal, large amounts of steam will escape which increases the total amount of steam required. In many cases, the cost of supplying steam to pressurize the valve can be significant.

BRIEF SUMMARY

The present invention extends to a seat system of a deheading valve for a coke drum. The seat system of the present invention can include a groove in the surface of the seat for supplying a lubricant to the surface of the seat. Various channels can be formed in the body of the valve that connect to the groove. In this way, lubricant can be flowed through the channels and into the groove to provide lubrication between the surface of the seat and the blind.

The seat system of the present invention can also include a split ring packing gland to facilitate the formation of a seal within the deheading valve. The split ring packing gland can be used to retain and compress packing positioned between a retainer and a dynamic seat such that when the packing is compressed, an improved seal is formed. In some embodiments, this packing can comprise a material consisting of an inner wire mesh core covered by an outer weave. By improving the seal, less steam can be required during the delayed coking process thereby increasing the efficiency of the system.

In other embodiments, the packing gland can be secured to the retainer using one or more centering disks. The use of the centering disks can alleviate tolerance issues that may exist between the components of the seat system.

In some embodiments, the present invention is implemented as a seat system of a deheading valve for use on a coke drum. The seat system comprises a first seat assembly attached to a main body of the deheading valve, and a second seat assembly attached to the main body opposite the first seat so that a blind can slide between the first and second seat assemblies to open and close the deheading valve. A surface of the second seat assembly that contacts the blind includes a groove in which lubricant is flowed to provide lubrication between the surface of the second seat assembly and the blind. The main body includes one or more channels for supplying the lubricant to the groove.

In some embodiments, the present invention is implemented as a seat system of a deheading valve for use on a coke drum. The seat system comprises a first seat assembly attached to a main body of the deheading valve, and a second seat assembly attached to the main body opposite the first seat assembly so that a blind can slide between the first and second seat assemblies to open and close the deheading valve. The second seat assembly comprises a seat that contacts the blind, a packing gland comprised of a plurality of split rings that each include a recess, the seat being secured to the packing gland, and a retainer secured to the main body. The retainer includes a protrusion which inserts into the recess in each of the split rings of the packing gland.

In some embodiments, the present invention is implemented as a seat system of a deheading valve for use on a coke drum. The seat system comprises an upper seat assembly attached to a main body of the deheading valve, and a lower seat assembly attached to the main body opposite the upper seat assembly so that a blind can slide between the upper and lower seat assemblies to open and close the deheading valve. The upper seat assembly comprises an upper seat that contacts the blind, a packing gland comprised of a plurality of split rings that each includes a recess, the upper seat being secured to the packing gland, and a retainer secured to the main body. The retainer includes a protrusion which inserts into the recess in each of the split rings of the packing gland. The lower seat assembly comprises a lower seat that includes a surface that contacts the blind. The surface includes a groove in which lubricant is flowed to provide lubrication between the surface and the blind.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 10A illustrates a perspective view of an example of a centering disk;

FIG. 13 illustrates a top view of a blind that includes an opening with a leading edge having reinforcing material to prevent the misshaping of the opening.

DETAILED DESCRIPTION

Figure 1:
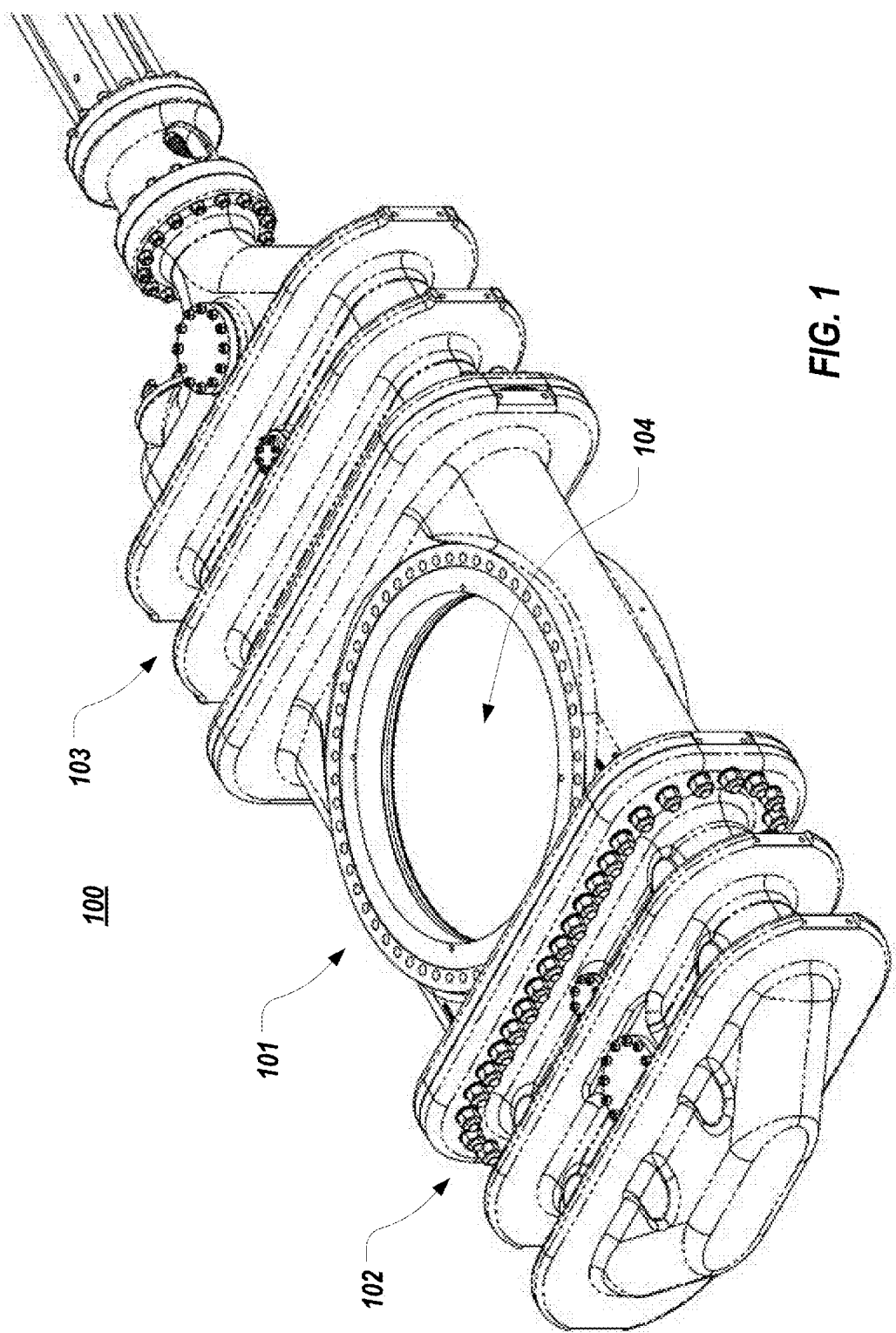
FIG. 1 illustrates an example of a deheading valve in which the present invention can be implemented.

The present invention extends to a seat system of a deheading valve for a coke drum. The seat system of the present invention can include a groove in the surface of the seat for supplying a lubricant to the surface of the seat. Various channels can be formed in the body of the valve that connect to the groove. In this way, lubricant can be flowed through the channels and into the groove to provide lubrication between the surface of the seat and the blind.

The seat system of the present invention can also include a split ring packing gland to facilitate the formation of a seal within the deheading valve. The split ring packing gland can be used to retain and compress packing positioned between a retainer and a dynamic seat such that when the packing is compressed, an improved seal is formed. In some embodiments, this packing can comprise a material consisting of an inner wire mesh core covered by an outer weave. By improving the seal, less steam can be required during the delayed coking process thereby increasing the efficiency of the system.

In other embodiments, the packing gland can be secured to the retainer using one or more centering disks. The use of the centering disks can alleviate tolerance issues that may exist between the components of the seat system.

In some embodiments, the present invention is implemented as a seat system of a deheading valve for use on a coke drum. The seat system comprises a first seat assembly attached to a main body of the deheading valve, and a second seat assembly attached to the main body opposite the first seat so that a blind can slide between the first and second seat assemblies to open and close the deheading valve. A surface of the second seat assembly that contacts the blind includes a groove in which lubricant is flowed to provide lubrication between the surface of the second seat assembly and the blind. The main body includes one or more channels for supplying the lubricant to the groove.

In some embodiments, the present invention is implemented as a seat system of a deheading valve for use on a coke drum. The seat system comprises a first seat assembly attached to a main body of the deheading valve, and a second seat assembly attached to the main body opposite the first seat assembly so that a blind can slide between the first and second seat assemblies to open and close the deheading valve. The second seat assembly comprises a seat that contacts the blind, a packing gland comprised of a plurality of split rings that each include a recess, the seat being secured to the packing gland, and a retainer secured to the main body. The retainer includes a protrusion which inserts into the recess in each of the split rings of the packing gland.

In some embodiments, the present invention is implemented as a seat system of a deheading valve for use on a coke drum. The seat system comprises an upper seat assembly attached to a main body of the deheading valve, and a lower seat assembly attached to the main body opposite the upper seat assembly so that a blind can slide between the upper and lower seat assemblies to open and close the deheading valve. The upper seat assembly comprises an upper seat that contacts the blind, a packing gland comprised of a plurality of split rings that each includes a recess, the upper seat being secured to the packing gland, and a retainer secured to the main body. The retainer includes a protrusion which inserts into the recess in each of the split rings of the packing gland. The lower seat assembly comprises a lower seat that includes a surface that contacts the blind. The surface includes a groove in which lubricant is flowed to provide lubrication between the surface and the blind.

FIG. 1 illustrates an example of a deheading valve 100 within which embodiments of the present invention can be implemented. Deheading valve 100 includes a main body 101, an upper bonnet 102 attached to main body 101, and a lower bonnet 103 attached to main body 101 opposite upper bonnet 102. A blind 104 is positioned between an upper and lower seat (not shown). Blind 104 slides within main body 101 and upper and lower bonnets 102, 103 to open and close deheading valve 100.

Seat Having a Lubrication Groove

Figure 2:
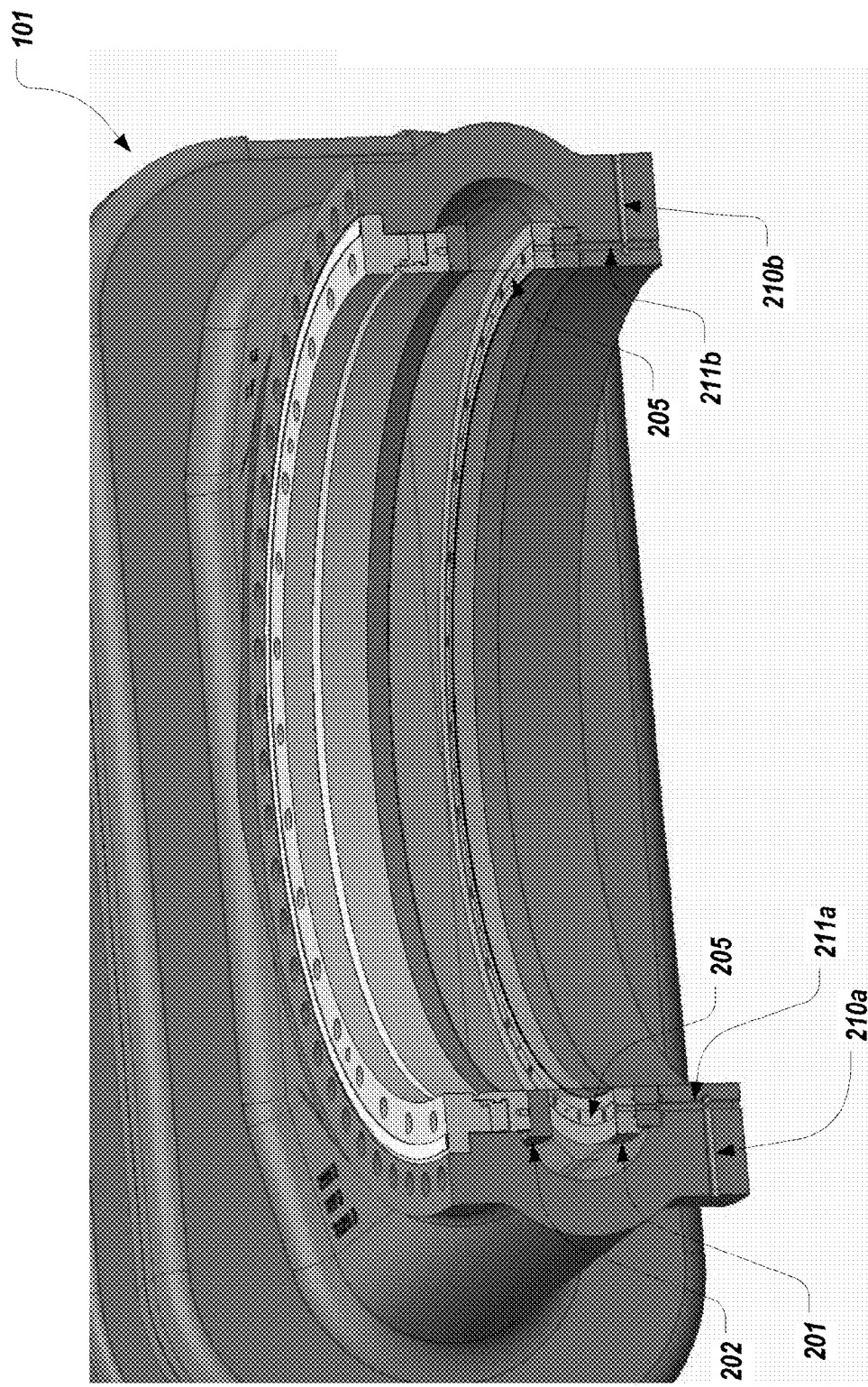
FIG. 2 illustrates a cross-sectional view of a main body of a deheading valve in which a seat includes a groove for supplying lubrication.

FIG. 2 illustrates a cross-sectional view of main body 101. As shown, main body 101 includes a lower seat 201 and an upper seat 202. Blind 104 (which is not shown in FIG. 2) slides between lower and upper seats 201, 202. The tight tolerances between blind 104 and lower and upper seats 201, 202 assist in forming a seal within a coke drum to which deheading valve 100 is attached and also cause coke that has formed on blind 104 to be sheared off as blind 104 slides between the seats.

FIG. 2 also shows that lower seat 201 can contain a groove 205 that is formed in the seat's upper surface. Groove 205 is shown as extending 180 degrees around lower seat 201. However, in some embodiments, groove 205 can extend more or less than 180 degrees around lower seat 201. For example, groove 205 can extend completely (i.e. 360 degrees) around lower seat 201, or only partially (e.g. 60 degrees) around lower seat 201.

One benefit of configuring groove 205 to extend only partially around lower seat 201 is that, in this manner, groove 205 can remain covered by blind 104 even when blind 104 is slid to open deheading valve 100. Because the lubricant is often supplied under high pressure, configuring groove 205 to remain covered even when deheading valve 100 is opened can reduce the likelihood that the pressure will cause the lubricant to escape groove 205. Also, even though this specification describes a groove 205 only in lower seat 201, a similar groove could also be formed in upper seat 202 and can function in a similar manner as groove 205 as will be described below.

Groove 205 serves as a channel in which grease can be flowed to provide lubrication between lower seat 201 and the bottom surface of blind 104. To distribute lubrication to groove 205, main body 101 can include various channels providing a passageway from an exterior of main body 101 into groove 205. For example, FIG. 2 shows horizontal channels 210a and 210b which intersect with vertical channels 211a and 211b respectively.

Forming channels in this manner (i.e. using a generally horizontal channel combined with a generally vertical channel) can facilitate manufacturing of a passageway to groove 205. For example, the channels can be individually drilled through main body 101 in a straight manner. After the channels are formed, the external opening of one channel (which may typically be the vertical channel) can be sealed so that lubrication supplied into the corresponding unsealed channel will flow upwardly through the vertical channel and into groove 205.

As shown in FIG. 2, two horizontal channels 210a, 210b can be used. However, one, two, or more horizontal channels can also be used. One benefit of using multiple horizontal channels is that it facilitates even distribution of the lubricant. Specifically, when blind 104 is closed (and therefore covers groove 205), lubricant can be injected at high pressure into groove 205. With blind 104 covering groove 205, a channel is formed between blind 104 and lower seat 201 through which the lubricant can flow. By using multiple horizontal channels (i.e. sources), lubricant need only flow partially around groove 205 to ensure that the entire groove 205 is filled.

Figure 3:
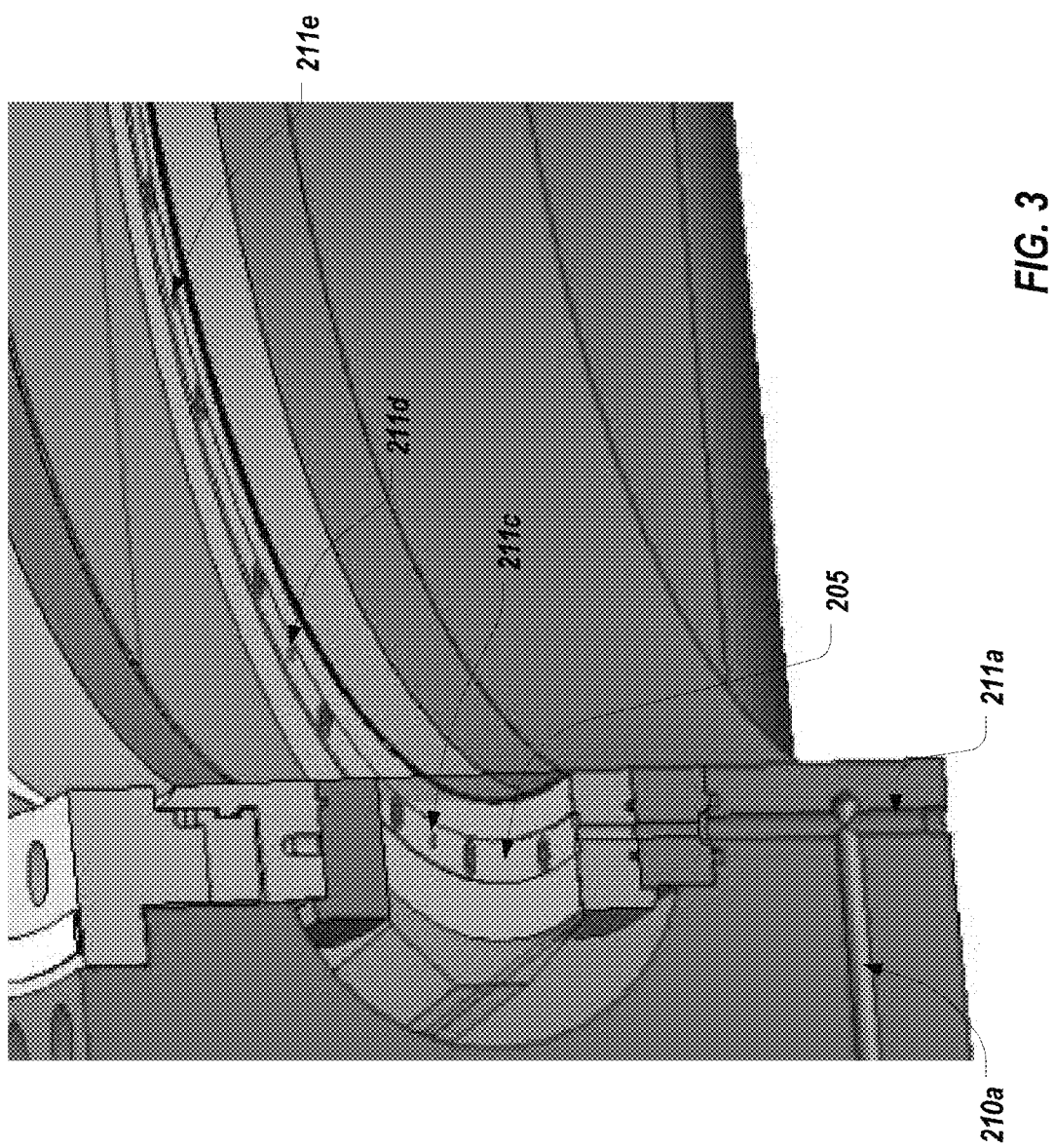
FIG. 3 illustrates a closer view of the cross-sectional view of FIG. 2 to illustrate that a plurality of vertical channels can be used to supply lubrication to the groove.

The above description has generally assumed that vertical channels 211a and 211b are the only channels into groove 205 (and therefore an equal number of vertical and horizontal channels are used). However, in some embodiments, there can be more vertical channels than horizontal channels. FIG. 3 better illustrates how more vertical channels can be used.

FIG. 3 illustrates a closer view of a portion of FIG. 2. To enable the use of more vertical channels than horizontal channels, main body 101 can include an internal channel (not shown in FIG. 3) which extends within main body 101 generally below lower seat 201. This internal channel can connect each vertical channel together and can be the source of lubricant for each vertical channel. In other words, lubricant supplied into one or more horizontal channels (e.g. horizontal channels 210a and/or 210b) can flow into and through the internal channel, into each vertical channel, and ultimately into groove 205. In FIG. 3, three additional vertical channels 211c, 211d, and 211e are shown. Each of these vertical channels, like vertical channels 211a and 211b, can be intersected by the internal channel from which they receive lubricant. By using many vertical channels as shown in FIG. 3, lubricant can be more easily distributed around the full length of groove 205.

Figure 4:
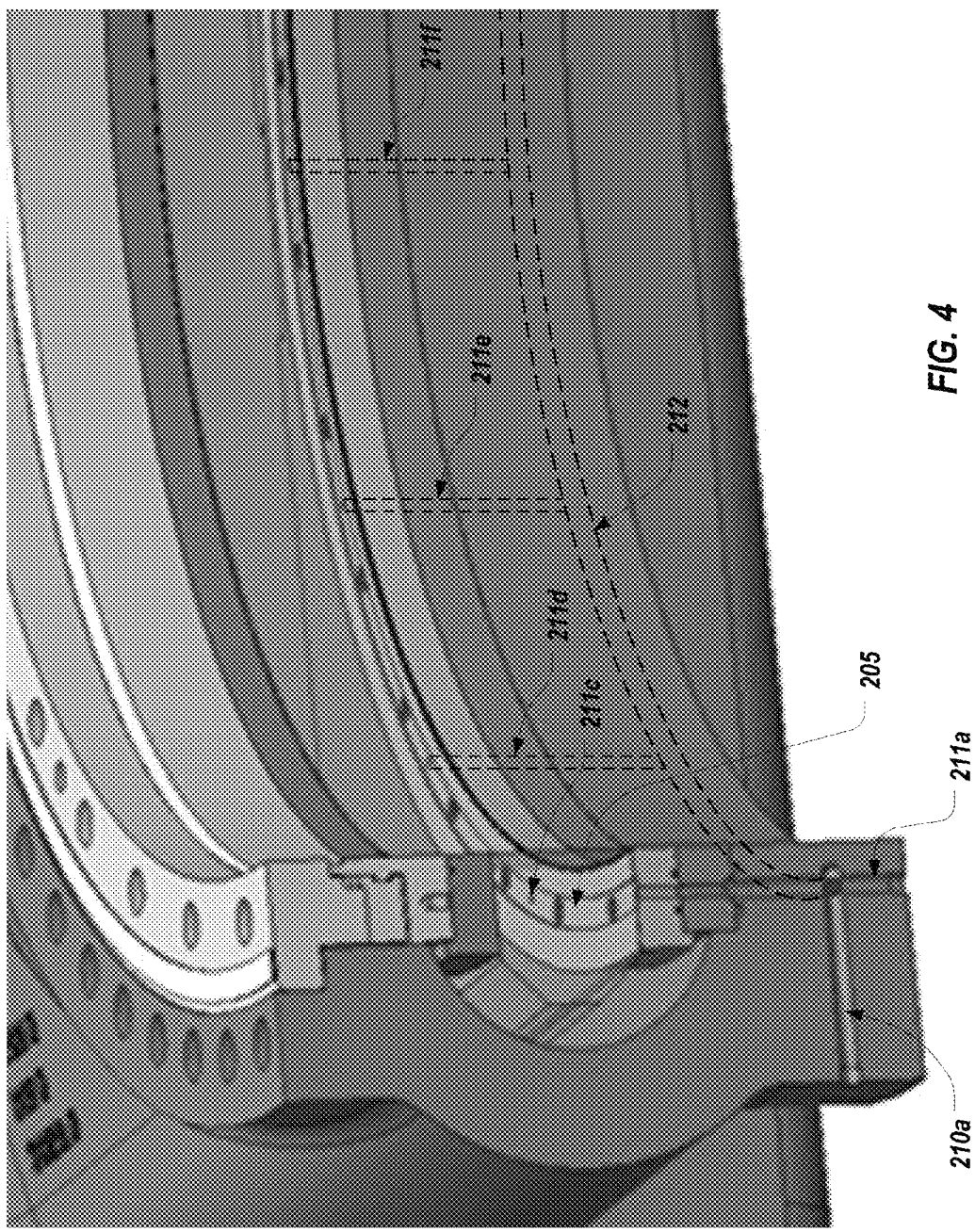
FIG. 4 illustrates another closer view of the cross-sectional view of FIG. 2 to illustrate that an internal channel can be used to supply lubrication to the vertical channels.

FIG. 4 illustrates one example of how an internal channel 212 can be used to supply lubricant to many vertical channels. Internal channel 212 connects each of vertical channels 211a-211f to horizontal channel 210a (and possibly horizontal channel 210b). Accordingly, lubricant supplied through horizontal channel 210a (and possibly another horizontal channel such as horizontal channel 210b) will flow into internal channel 212 and through each of the connected vertical channels.

Accordingly, a deheading valve configured in accordance with the present invention can include one or more seats which include a groove for distributing lubricant around at least a portion of the seat. Any reasonable number of horizontal, vertical, and/or internal channels can be used to supply the lubricant through the main body of the valve and into the groove. For example, one horizontal channel (e.g. 210a) can supply lubricant to an internal channel which supplies the lubricant to one or more vertical channels. Similarly, two or more horizontal channels could also be used to supply lubricant to the same internal channel. In contrast, multiple internal channels could be used which may each be connected to a subset of vertical channels. Each of the multiple internal channels may also be supplied by a single horizontal channel. This configuration can be beneficial in cases where it is desirable to supply grease through different vertical channels or at different pressures.

In cases where a groove is formed on both lower and upper seats 201, 202, the grooves can be supplied independently via separate channels or jointly through one or more common channels. Accordingly, many different configurations of channels can be used to supply lubricant through the main body to a groove formed in the exterior surface of a seat.

Seat Having a Split Ring Packing Gland

Figure 5:
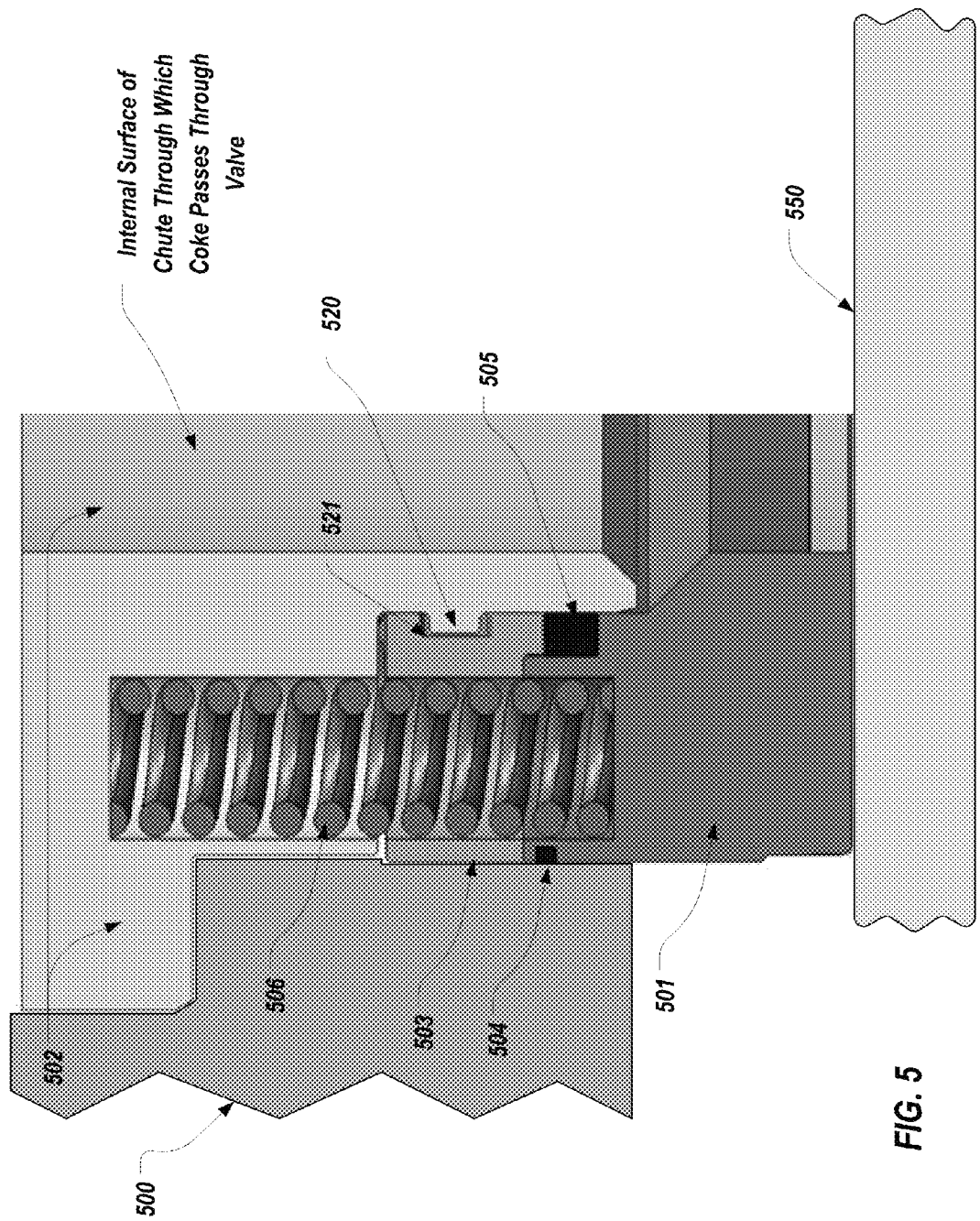
FIG. 5 illustrates a cross-sectional view of a seat assembly in which the cross-section is taken at the location of a spring.
Figure 6:
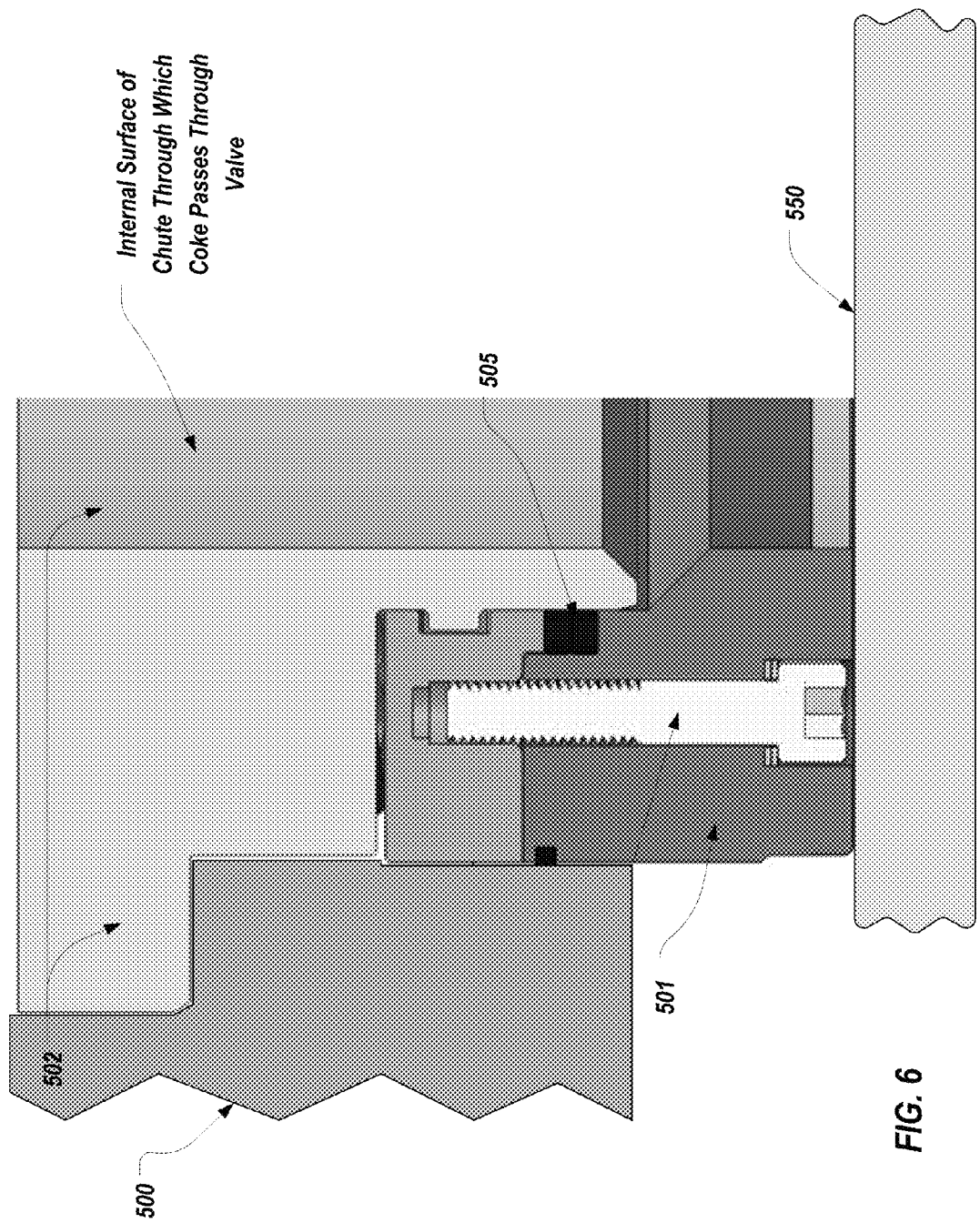
FIG. 6 illustrates a cross-sectional view of the seat assembly of FIG. 5 in which the cross-section is taken at the location of a bolt.

FIGS. 5 and 6 each illustrate different cross-sectional views of a portion a deheading valve that includes a seat assembly that employs a split ring packing gland 503. The portion of the deheading valve shown in FIGS. 5 and 6 includes a portion of the main body 500 to which the seat assembly is connected and blind 550. The seat assembly includes three primary components: seat 501 (which in this case is the upper seat of the deheading valve), retainer 502, and split ring packing gland 503.

As shown in FIG. 6, seat 502 is secured to split ring packing gland 503 via a series of bolts 507. Bolts 507 extend through seat 501 and into packing gland 503 and may be spaced around the seat as shown in the exploded view of FIG. 7. Bolts 507 secure seat 501 to packing gland 503 to form a single cartridge. In some embodiments, one or more of bolts 507 may comprise a dowel pin 530 and set screw 531 as shown in FIG. 8.

As shown in FIG. 5, springs 506 are positioned between retainer 502 and seat 501 (extending through packing gland 502) and therefore bias seat 501 away from retainer 502. In this way, seat 501 is forced downwardly against blind 550 while retaining the ability to move upwardly with the contour of the blind as the blind is slid between the seats.

The downward movement of packing gland 503 and seat 501 is limited due to the interaction of protrusion 520 and recess 521 which are formed in retainer 502 and packing gland 503 respectively. Recess 521 is wider than protrusion 520 (which in the drawings is measured as the vertical distance) thereby allowing the vertical movement of packing gland 503 with respect to retainer 502.

Figure 7:
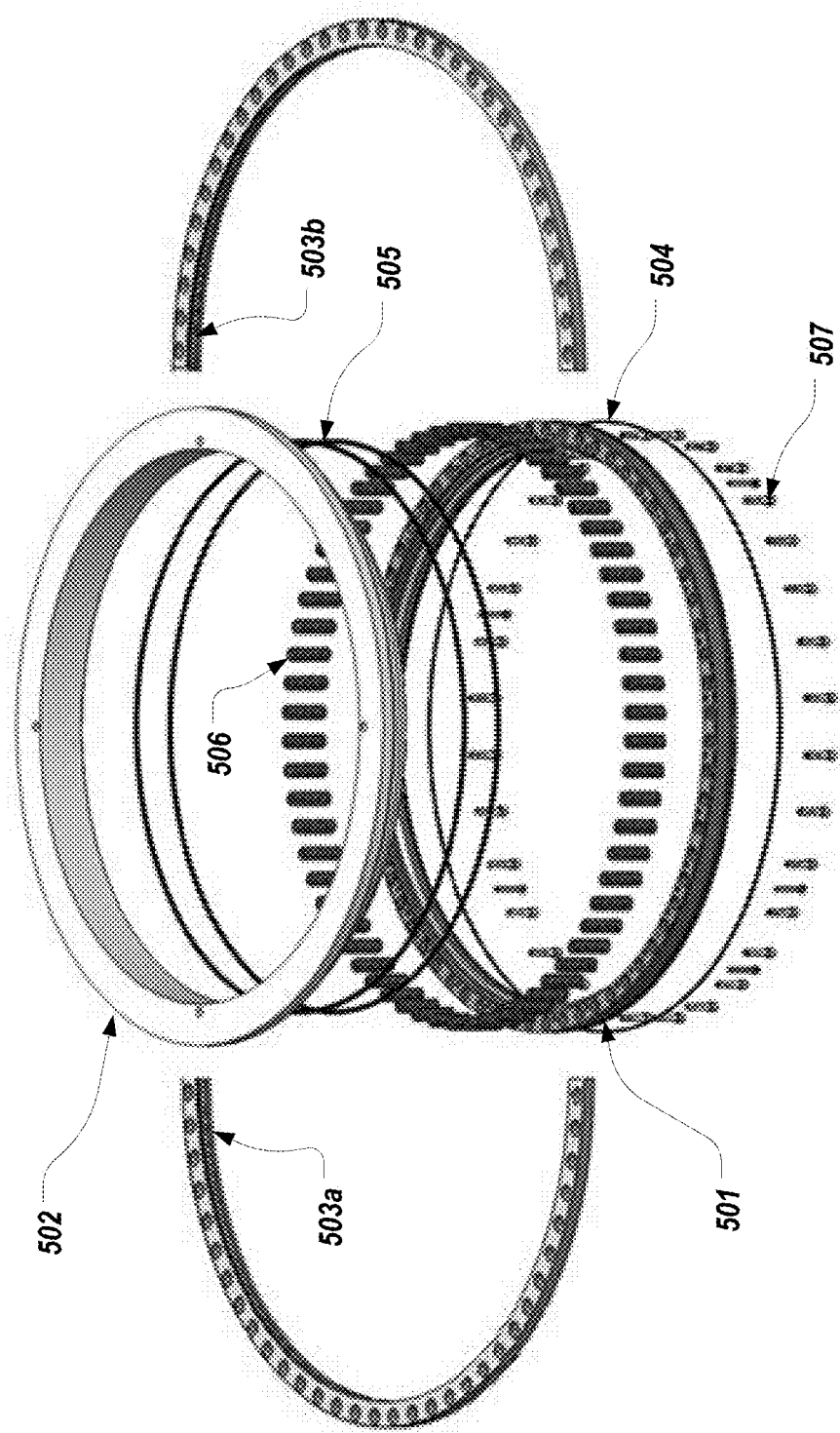
FIG. 7 illustrates an exploded view of a seat assembly that employs a split ring packing gland.
Figure 8:
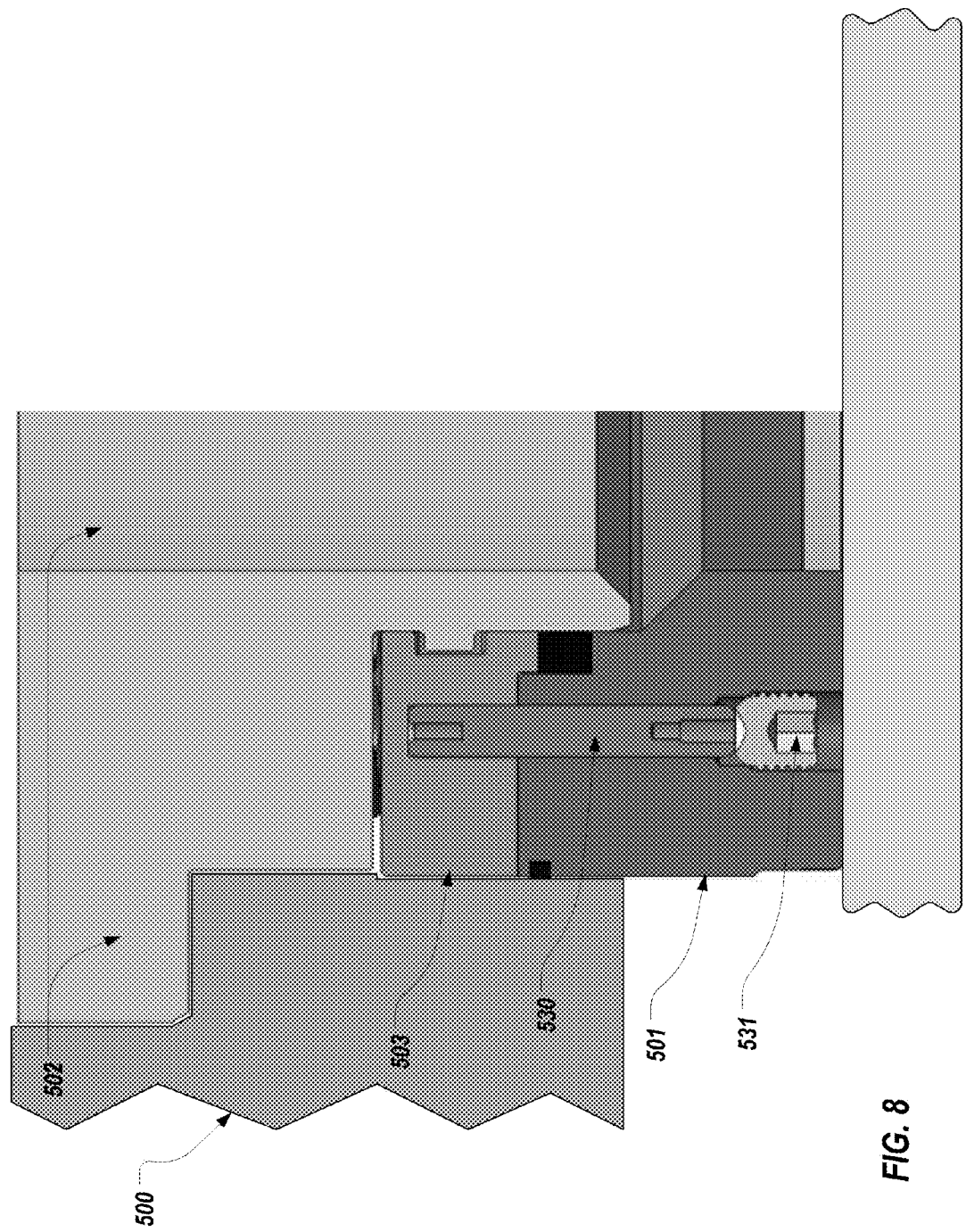
FIG. 8 illustrates a cross-sectional view of the seat assembly of FIG. 5 in which the cross-section is taken at the location of a dowel pin and set screws.
Figure 9:
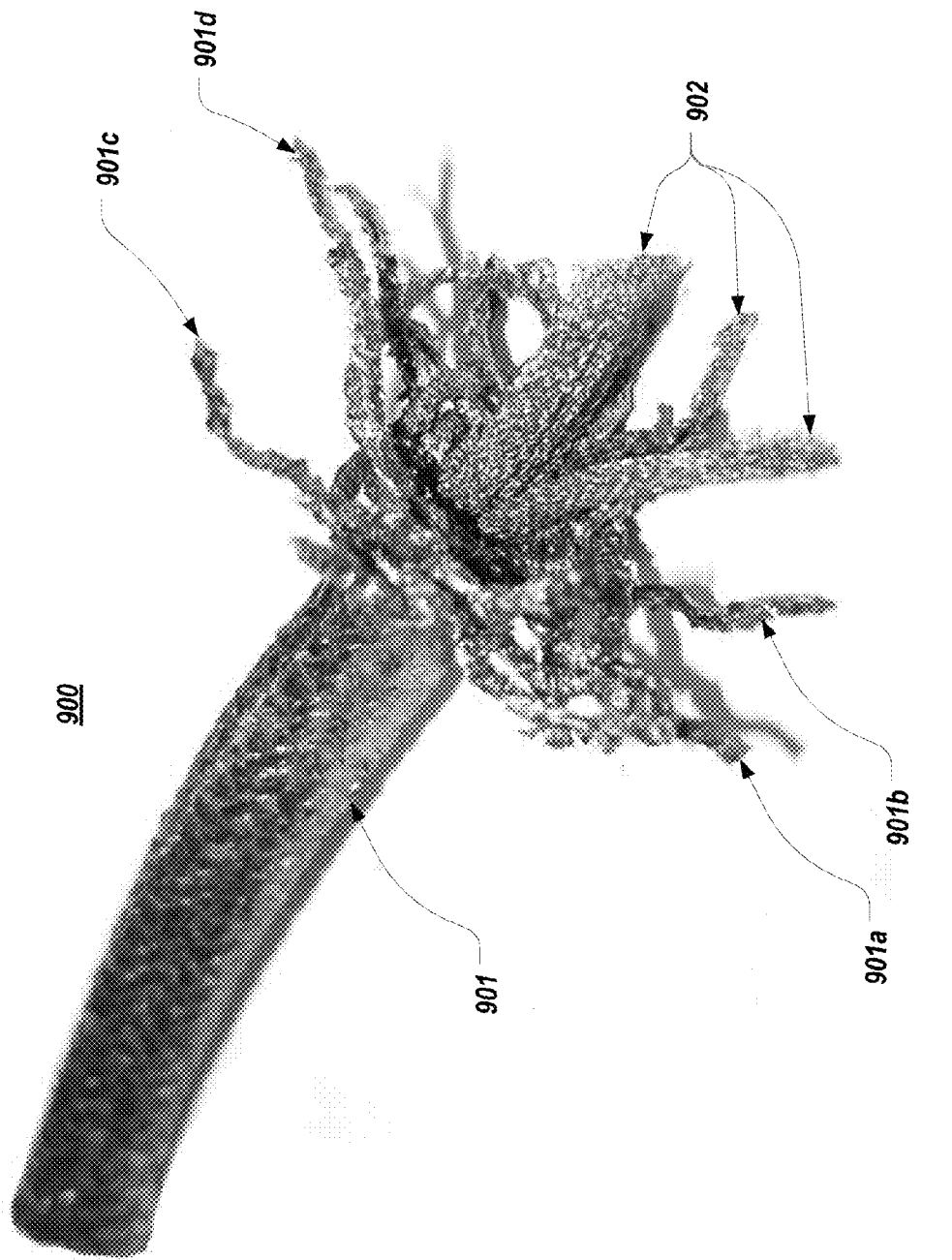
FIG. 9 illustrates an example of a strand of packing that includes an inner wire mesh core and an outer weave which can be used to provide a seal in a seat system.

The seat assembly also includes inner packing 505 (which in some embodiments may comprise two separate components such as is shown in FIGS. 7-9) and outer packing 504. When seat 501 is forced upwardly, inner packing 505 is compressed thereby enhancing the seal between seat 501 and retainer 502. This seal can prevent gas and matter from passing from within the coke drum or chute of the valve and into the inside of the deheading valve. Similarly, this seal can prevent steam from passing from within the internals of the deheading valve and into the coke drum.

Similarly, packing 504 provides a seal between seat 501 and main body 500. This seal prevents steam that is built up within the deheading valve from exiting the valve. This seal can also assist in preventing gas or matter from passing from within the coke drum or chute of the valve and into the inside of the deheading valve. The seals formed by packing 504 and packing 505 are further described below.

To facilitate the use of protrusion 520 and recess 521, packing gland 503 is formed as a split ring which is shown in FIG. 7 as split rings 503a and 503b. By using a split ring, packing gland 503 can be installed overtop of protrusion 520. Specifically, because the internal diameter of packing gland 503 at recess 521 is greater than the external diameter of retainer 502 at protrusion 520, each of split rings 503a and 503b can be placed around retainer 502 by aligning recess 521 with protrusion 520 and sliding the split ring overtop of retainer 502. Once each of split rings 503a and 503b of packing gland 503 is in place, seat 501 can be attached to packing gland 503 using bolts 507.

Packing for Reducing Steam Consumption

Because the coking process requires high pressures within the coke drum, steam is often used to pressurize the inside of the deheading valve to prevent matter from passing from within the coke drum to inside the deheading valve (e.g. due to pressure differences that would otherwise exist). Supplying this steam to pressurize the deheading valve can be a significant cost in a delayed coking operation. Accordingly, minimizing the amount of steam that escapes from inside the deheading valve is an important consideration when designing a deheading valve.

As shown in FIGS. 5-10, packing 505 can be used to create a seal between seat 501 and retainer 502. Similarly, packing 504 can be used to create a seal between seat 501 and main body 500. Because the interface between packing gland 503 and retainer 502 as well as between seat 501 and main body 500 is dynamic (i.e. there is vertical movement between the two components), steam is often most likely to escape through this interface. By providing packing 505 between seat 501 and retainer 502 and packing 504 between seat 501 and main body 500, steam can be prevented from escaping through the interface.

When seat 501 is displaced upwardly, packing 505 is compressed between packing gland 503 and seat 501. This vertical compression forces packing 505 to expand in a horizontal direction (i.e. against retainer 502 and seat 501) thereby increasing the seal.

Because this compression of packing 505 occurs relatively frequently, packing 505 tends to wear out which results in an increase in steam consumption over time. To address the wearing out of many materials that have been used for packing 505, the present invention employs a material designed to maximize the resiliency of packing 505 when subject to repeated compression.

In some embodiments, this material comprises an inner wire mesh core covered by an outer weave. In some embodiments, the inner wire mesh core can comprise a nickel-chromium-based superalloy (e.g. an Inconel® alloy) or a nickel alloy (e.g. a Monel® alloy) woven wire mesh core, whereas the outer core can comprise expanded graphite with an oxidation resistant additive. By employing a wire mesh core, packing 505 can provide greater resiliency, spring back, and recovery from compression. In this way, packing 505 can provide an adequate seal for a longer period of time thereby minimizing the frequency of service required for the deheading valve.

FIG. 9 illustrates an example of a segment of packing 900 that can be used as packing 504 or packing 505 in a deheading valve in accordance with one or more embodiments of the present invention. As shown, packing 900 includes a woven outer sheath 901 (where 901a-901d identify various unwound strands of the sheath). Woven outer sheath 901 comprises expanded graphite with an oxidation resistant additive. Packing 900 also includes a woven wire mesh core 902. In packing 900, woven wire mesh core 902 is comprised of multiple woven strands (as indicated by the multiple arrows). Each of the woven strands comprises an Inconel® or Monel® (or similar type) alloy. In other embodiments, a single (larger) woven strand may be used as woven wire mesh core 902. Also, in some embodiments, a single strand of packing 900 can be used for packing 505. In other embodiments, two or more stands of packing 900 can be used for packing 505.

Variations to the Seat System

In some implementations of the seat system of the present invention, it may be desired to enhance the sealing capability of the seat system. For example, in the above described design of the seat system, it may be difficult to manufacture the components with sufficiently accurate tolerances to minimize the escape of steam through the seat system. In some specific cases, a tolerance issue may arise between retainer 502 and the other components. For example, if the relative lateral position (which is the side-to-side position in FIG. 10) of retainer 502 and the packing gland 503/seat 501 assembly is not fixed, relative movement between these two components can weaken the seal formed by packing 505.

Figure 10:
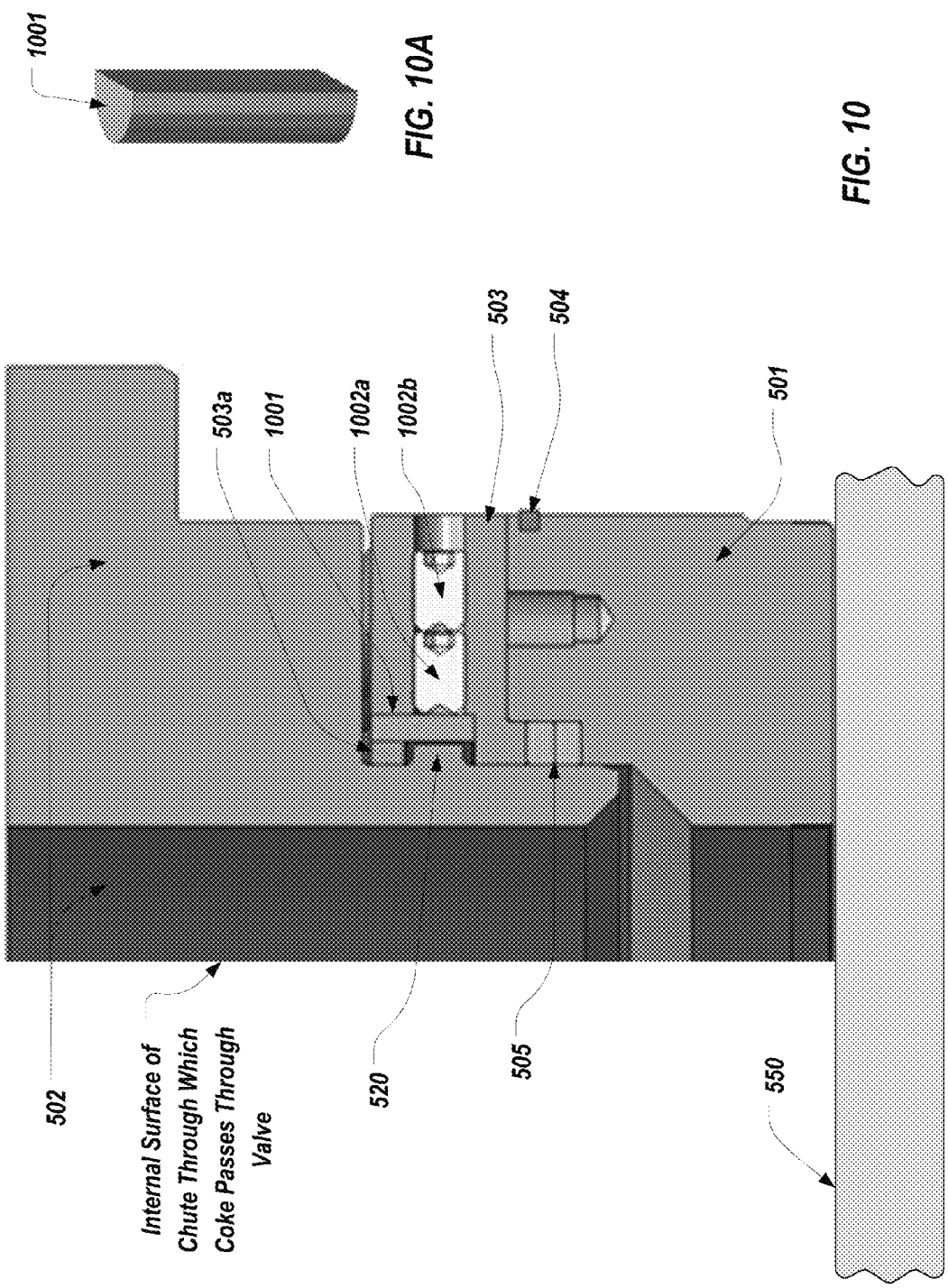
FIG. 10 illustrates a cross-sectional view of a seat assembly in which a centering disk is used to account for tolerance issues between the components of the assembly.
Figure 11:
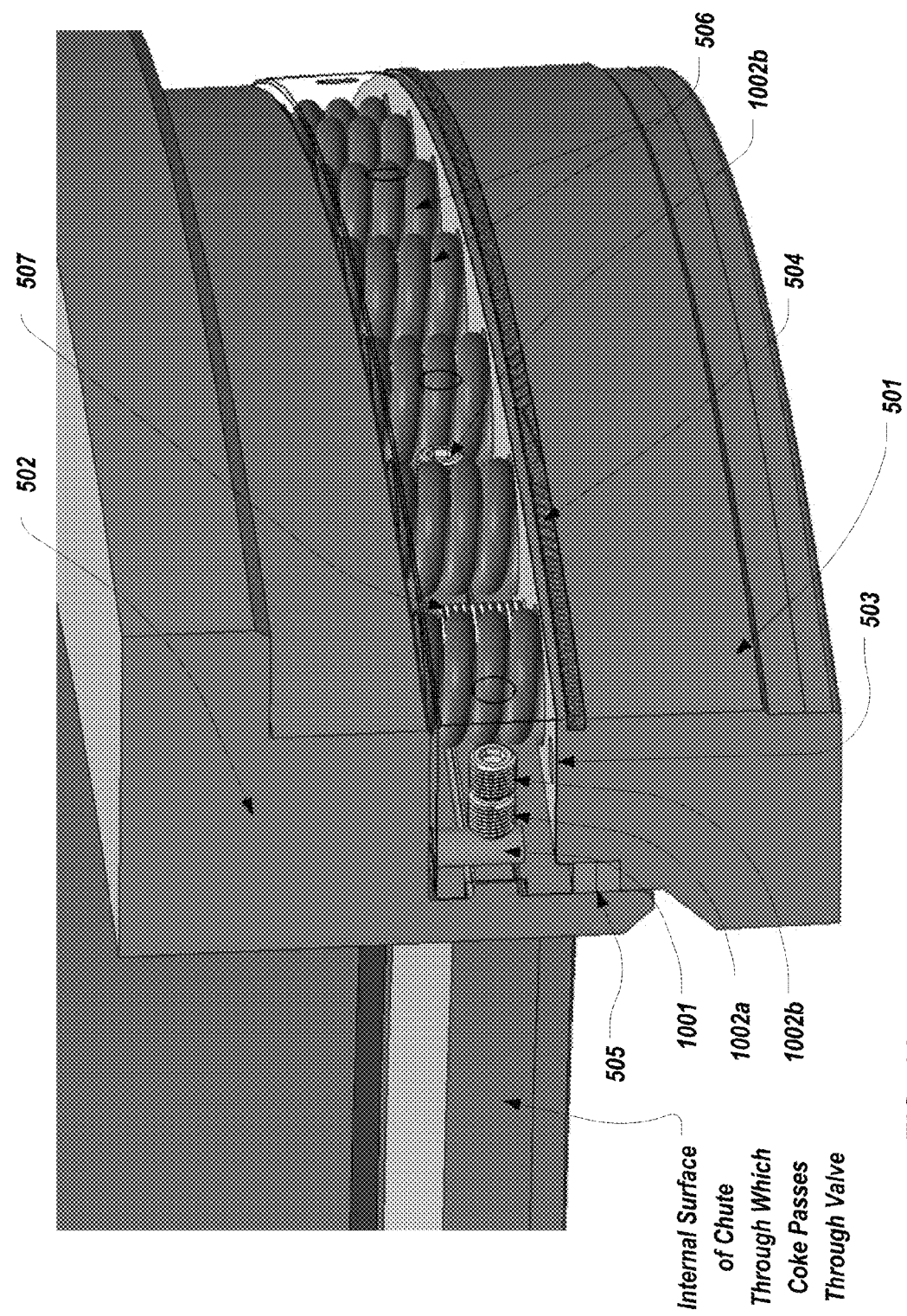
FIG. 11 illustrates a perspective view of the seat assembly of FIG. 10.

As shown in FIGS. 10 and 11, to address the tolerance issue, the seat system can be modified to include one or more centering disks 1001 and adjustment screws 1002a, 1002b. The centering disks lock the relative lateral positions of retainer 502 and the seat 501/packing gland 503 assembly. FIG. 10A illustrates a perspective view of a centering disk 1001. In FIG. 11, packing gland 503 is shown as being transparent to allow centering disk 1001 and adjustment screws 1002a, 1002b to be seen. Also, in FIG. 11, a second adjustment screw 1002b is identified to illustrate that more than one centering disk 1001 can be used around the seat system. It is noted that the main body of the deheading valve is not shown in FIGS. 10 and 11 for clarity. However, in FIGS. 10 and 11, the main body would be to the right of the components (which is opposite from the view shown in FIGS. 5, 6, and 8).

As best shown in FIG. 10, centering disk 1001 is inserted into packing gland 503 so that it can be positioned against protrusion 520. With centering disk 1001 inserted into packing gland 503, one or more adjustment screws 1002a, 1002b can be threaded into a corresponding hole in packing gland 503 so as to secure centering disk 1001 against protrusion 520. This force against centering disk 1001 also forces packing gland 503 inwardly against retainer 502 (by pressing against point 503a of packing gland 503). This causes packing gland 503 and retainer 503 to be secured together tightly to prevent lateral movement between retainer 502 and seat 501 which enhances the seal created between the components. In this way, any tolerance issues can be alleviated thereby reducing the amount of steam necessary to pressurize the deheading valve.

In preferred embodiments, many centering disks 1001 can be spaced around packing gland 503 (such as is shown in FIG. 11). Although two adjustment screws 1002a, 1002b are shown in FIGS. 10 and 11, it is also possible to secure centering disk 1001 against protrusion 520 using other numbers (including one) of adjustment screws or other securing means.

Figure 12:
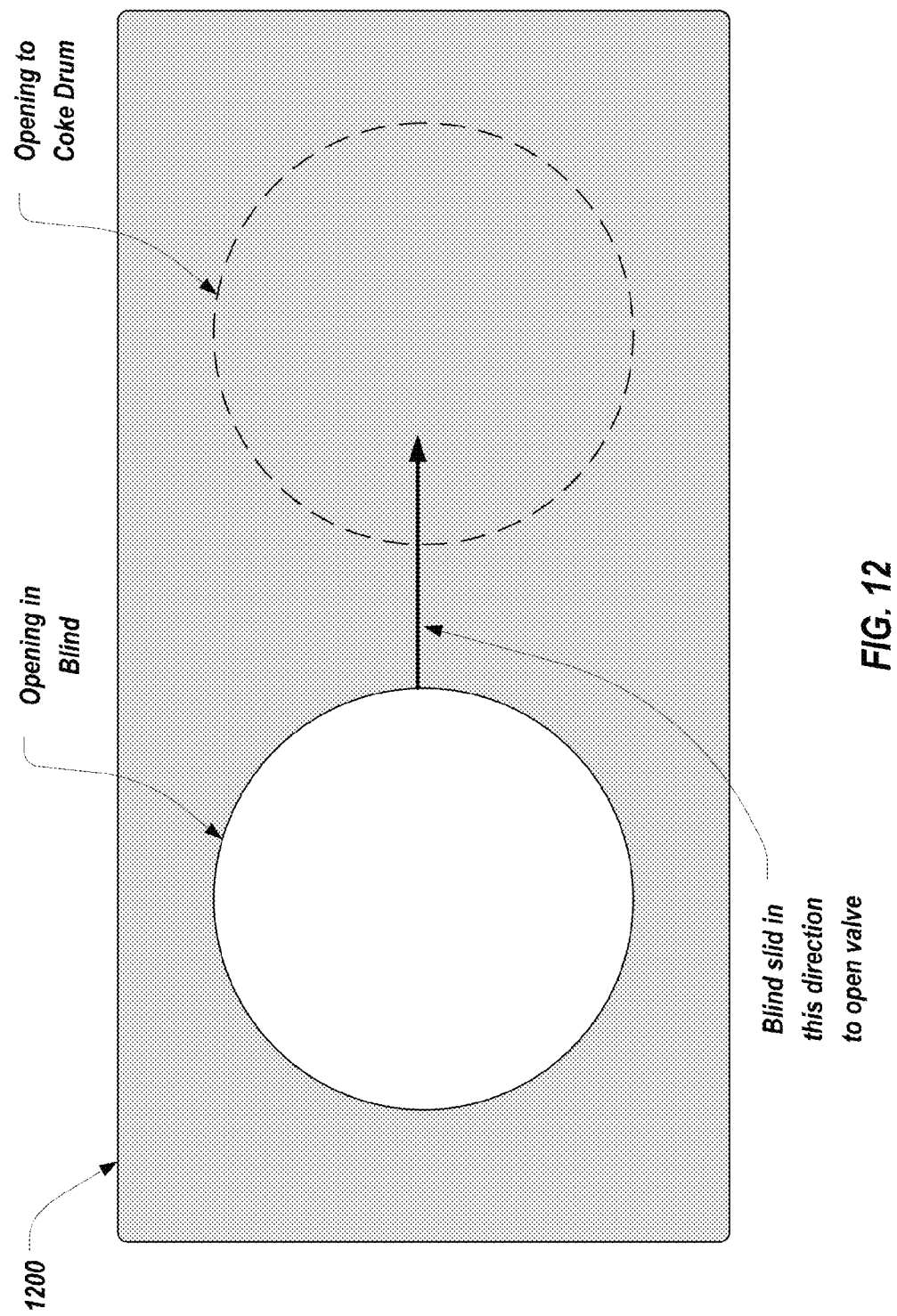
FIG. 12 illustrates a top view of a blind that can be used within the seat assembly of the present invention.

In some implementations of the seat system of the present invention, it may be desired to reinforce the blind to prevent the blind from becoming misshaped. For example, as shown in FIG. 12, a typical blind 1200 includes an opening that generally matches the shape of the opening to the coke drum formed by the seats of the deheader valve. Typically, this shape is a circle as shown. FIG. 12 therefore represent blind 1200 in a closed position because the two openings are not aligned.

When the blind is slid from the closed to the open position (which would be to the right in FIG. 12), the leading edge of the circular shaped opening comes in direct contact with the heated contents of the coke drum and is therefore heated before the remaining portions of the opening. Because a substantial amount of force is applied to blind 1200 as it is slid and because blind is heated to a substantial temperature while being slid, the shape of the opening in blind 1200 tends to change. For example, the opening can change into an oval over time due to the repeated cycling of blind 1200 from the closed to the open position.

In some embodiments of the invention, a blind can be modified to include reinforcing material that prevents the misshaping of the opening. FIG. 13 illustrates an example of how reinforcing material can be built in to the opening. As shown, blind 1200 has been modified to include various sections of reinforcing material positioned at the leading edge of the blind.

The reinforcing material can be selected based on various characteristics. For example, the reinforcing material can be a metal or other material that exhibits a high level of conductivity to more efficiently distribute heat around the opening. By distributing the heat more evenly, the misshaping of the blind caused by unequal heating of the blind material around the opening can be minimized. Similarly, the reinforcing material can be a metal or other material that exhibits greater strength when heated than the material from which the remainder of the blind is made. In such cases, the reinforcing material can prevent the more pliable material from misshaping.

Although FIG. 13 illustrates seven sections of reinforcing material 1201, any reasonable number of sections can be used. Also, the reinforcing material can be distributed around a greater or lesser section of the opening than is shown in FIG. 13. For example, the sections can be spaced around 180, 120, 90, 60, 45, or 30 degrees, or any other amount of the leading edge as desired to provide the appropriate amount of reinforcement to prevent the misshaping of the opening. In some cases, it may also be desirable to include reinforcing material around more than 180 degrees of the opening (i.e. beyond the leading half of the opening). Accordingly, a blind can include reinforcing material around any amount of the opening in accordance with one or more embodiments of the invention.

Also, although FIG. 13 illustrates independent sections of reinforcing material, in some embodiments, a single longer section of reinforcing material can extend around a portion of the opening. Also, in some embodiments, multiple sections may be used with connecting reinforcing material extending between adjacent sections to interconnect each of the sections.

In summary, a seat system in accordance with the present invention can be designed with a split ring packing gland that enables the use of a protrusion on the retainer for interlocking with a recess in the packing gland. This interlocking of components can enhance the functionality of the seat system by, among other things, limiting the downward movement of the seat and enhancing the seal that is formed between the components of the seat system. The seal can also be enhanced by employing a material comprised of an inner wire mesh core covered by an outer weave that provides greater resiliency, spring back, and recovery from compression. Finally, the seat can be configured with a groove and channels for supplying a lubricant to the surface of the seat. Each of these features, as well as others described above, can increase the performance and durability of a deheading valve thereby reducing the overall costs involved in the delayed coking process. A deheading valve configured in this manner could also be used in environments other than coking environments as desired such as those requiring a high-pressure seal to be formed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A seat system of a deheading valve for use on a coke drum, the seat system comprising:
   a first seat assembly attached to a main body of the deheading valve; and
   a second seat assembly attached to the main body opposite the first seat assembly so that a blind can slide between the first and second seat assemblies to open and close the deheading valve, wherein the second seat assembly comprises:
   a seat that contacts the blind;
   a packing gland comprised of a plurality of split rings that each include a recess, the seat being secured to the packing gland; and
   a retainer secured to the main body, the retainer including a protrusion which inserts into the recess in each of the split rings of the packing gland, the protrusion being positioned to limit movement of the packing gland away from the retainer.

2. The seat system of claim 1, further comprising:
   a plurality of springs positioned between the retainer and the seat, the plurality of springs extending through the packing gland and into recesses in each of the retainer and the seat.

3. The seat system of claim 1, further comprising:
   packing positioned between the seat, packing gland, and retainer.

4. The seat system of claim 3, wherein the packing comprises an inner wire mesh core covered by an outer weave.

5. The seat system of claim 4, wherein the inner wire mesh core comprises a nickel-chromium-based alloy and the outer weave comprises a nickel alloy.

6. The seat system of claim 1, wherein the protrusion is also positioned to limit movement of the packing gland towards the retainer.

7. The seat system of claim 1, further comprising:
   one or more centering disks that are contained within the packing gland and secured against the protrusion of the retainer.

8. The seat system of claim 7, wherein the one or more centering disks are secured against the protrusion by one or more adjustment screws that insert into the packing gland to thereby limit the relative lateral movement between the retainer and the seat.

9. The seat system of claim 1, wherein an opening of the blind includes a leading edge having one or more sections of reinforcing material to prevent the misshaping of the opening.

10. The seat system of claim 1, wherein the plurality of split rings comprise two semi-circle rings.

11. The seat system of claim 1, wherein the seat is secured to the packing gland by a plurality of bolts that extend through the seat and into the packing gland.

12. The seat system of claim 11, wherein at least one of the plurality of bolts comprises a dowel pin and one or more set screws.

13. A seat system of a deheading valve for use on a coke drum, the seat system comprising:
   an upper seat assembly attached to a main body of the deheading valve; and
   a lower seat assembly attached to the main body opposite the upper seat assembly so that a blind can slide between the upper and lower seat assemblies to open and close the deheading valve;
   wherein the upper seat assembly comprises:
   an upper seat that contacts the blind;
   a packing gland comprised of a plurality of split rings that each include a recess, the upper seat being secured to the packing gland; and
   a retainer secured to the main body, the retainer including a protrusion which inserts into the recess in each of the split rings of the packing gland, the protrusion being positioned to limit movement of the packing gland away from the retainer; and
   wherein the lower seat assembly comprises:
   a lower seat that includes a surface that contacts the blind, the surface including a groove in which lubricant is flowed to provide lubrication between the surface and the blind.

14. The seat system of claim 13, wherein the main body includes:
   an internal channel that extends around at least a portion of the main body;
   one or more first channels that each have a first end that extends into the groove in the surface of the lower seat and a second end that extends into the internal channel; and
   one or more second channels that each have a first end that extends into the internal channel and a second end that extends to an exterior surface of the main body such that lubricant can be supplied through the one or more second channels, then through the internal channel, and finally through the one or more first channels into the groove.

* * * * *